United States Patent [19]
Johnson

[11] 3,858,901
[45] Jan. 7, 1975

[54] PITCH CONTROL FOR ALL TERRAIN VEHICLE

[75] Inventor: Norman B. Johnson, San Jose, Calif.

[73] Assignee: FMC Corporation, San Jose, Calif.

[22] Filed: Dec. 26, 1972

[21] Appl. No.: 318,160

[52] U.S. Cl............................ 280/96.2 R, 280/124 B
[51] Int. Cl............................................. B60g 3/18
[58] Field of Search....... 280/96.2 R, 112 A, 124 B, 280/124 A, 96.2 B; 180/44 R; 267/20 A, 57

[56] References Cited
UNITED STATES PATENTS

| | | | |
|---|---|---|---|
| 2,245,809 | 6/1941 | Olley | 280/124 B |
| 2,631,681 | 3/1953 | Utz et al. | 280/96.2 B X |
| 2,954,998 | 10/1960 | Kushler et al. | 280/96.2 R X |
| 3,124,370 | 3/1964 | Traugott | 280/96.2 B |

*Primary Examiner*—Kenneth H. Betts
*Attorney, Agent, or Firm*—C. E. Tripp

[57] ABSTRACT

A four wheel drive military vehicle, primarily for off-road use, with independent four wheel A-arm suspension is provided with a suspension geometry that provides a single transverse pitch axis which is adjacent the center of gravity of the vehicle.

2 Claims, 3 Drawing Figures

PITCH CONTROL FOR ALL TERRAIN VEHICLE

BACKGROUND OF THE INVENTION

1. Field of the Invention

The field of the present invention is a suspension for road vehicles. The invention is particularly useful in off-road military vehicles such as highly mobile, high speed vehicles incorporating independent A-arm type four wheel drive wheel suspension.

2. Reference to Related Applications

Pending U.S. Pat. application Ser. No. 81,236, filed Oct. 16, 1970 now U.S. Pat. No. 3,709,314, in the name of Victor F. Hickey and assigned to the FMC Corporation, discloses an off-road vehicle of the type described and claims a four wheel drive train arrangement for the vehicle.

PRIOR VEHICLE PROBLEMS

The problems associated with suspension geometry in four wheel drive vehicles have been extensively dealt with, in many different manners, in prior art patents. The interrelation of camber, caster, kingpin inclination, roll, anti-dive and anti-lift characteristics, and so forth, have long been recognized. Given the broad spectrum of operating conditions under which a military vehicle is expected to function, it is generally true that the overall suspension geometry is a compromise in many specific aspects.

For example, even driving over a smoothly contoured rise in the surface at high speed can result in loss of ground contact and a violent landing of the vehicle. However, if the vehicle were to land on four wheels simultaneously, or nearly so, the front and rear suspension geometry would approximate a severely but symmetrically loaded condition, and the steering characteristics would be less affected than when landing on one end first. This same condition exists, but to a lesser degree, even with the wheels retaining ground contact but with the vehicle pitching fore and aft on a rough terrain. The pitching disturbs the normal suspension geometry, and makes steering control difficult and unpredictable.

SUMMARY OF THE INVENTION

I have discovered that for a high speed, off-road four wheel vehicle with independent A-arm type of four wheel suspension, there is a critical aspect of the suspension which appears to be unrecognized as an essential consideration for minimizing the previously described problems. More specifically, my invention concerns a geometric arrangement of the wheel suspension control arm axes which will minimize the effects of fore and aft pitch and hence will make the vehicle less fatiguing to the driver and passengers, more susceptible to precise handling control, and less prone to lose traction or ground contact.

I have found that if a vehicle is provided with a front and rear wheel suspension geometry that provides instantaneous front and rear wheel suspension centers that are usually behind and ahead of the vehicle by substantially equal distances, the pitch axis of the vehicle itself will act as a transverse pitch axis that is midway between the front and rear wheels. Under these conditions longitudinal pitching will have minimum effect on the vehicle. If in addition, the center of gravity of the vehicle is adjacent this transverse pitch axis, an ideal condition exists, because the fore and aft balance is about evenly divided between the front and rear wheels. If the occupants of the vehicle are stationed at this transverse pitch axis, and over the center of gravity, the least pitching motion is sensed by the occupants.

The designer may locate the passengers near the center of gravity of the vehicle to achieve the best riding comfort. This alone, however, will not assure minimum fore and aft pitching of the vehicle, even if the center of gravity and the passenger location are midway between the front and rear wheels, because conventional suspension geometry causes the vehicle to tend to pitch about a variable position, transverse pitch axis that is not always near the center of gravity or passenger location. However, the present invention provides a suspension system wherein the pitch axis for the vehicle can be located closely adjacent to the center of gravity of the vehicle, whereby maximum vehicle stability, comfort and control are achieved when traveling over rough terrain, and under a variety of surface conditions.

The suspension of the present invention minimizes longitudinal pitch in a vehicle having four wheel, independent A-arm or control arm suspension by positioning the longitudinal frame pivot axes of the upper and lower control arms at each wheel to vertically converge and intersect outside the vehicle. The longitudinal pivot axes of the control arms for each front wheel intersect in a transverse line (the instantaneous center) that is rearward of the vehicle. Similarly, the longitudinal pivot axes of the upper and lower control arms for the rear wheels of the vehicle intersect along a horizontal axis (the instantaneous center) that is forward of the vehicle. Finally, the spacings of these front and rear intersections or instantaneous centers from the vehicle are at substantial distances from the vehicle and are substantially equal. This geometry provides the vehicle with a single effective transverse pitch axis that is always intermediate the front and rear wheels, and hence is adjacent the center of gravity of the vehicle and the passenger's location.

The single transverse pitch axis thus provided is located at the intersection of certain reference lines connecting the instantaneous front and rear centers for the control arms with the ground contact points of the front or rear wheels associated with those centers.

The single, effective transverse pitch axis thus determined is the axis through which an external vertical force, or a horizontal longitudinal force applied to the sprung portion of the vehicle will cause no pitching motion. By locating the pitch axis near the center of gravity, vertical accelerations of the spring portions of the vehicle result in minimal pitching, and longitudinal forces acting through the center of gravity have a short moment arm about the pitch axis. This minimizes the pitching that must be resisted by the front and rear suspensions individually, either by the springs or the conventional anti-dive and anti-lift geometry. In turn, this allows the use of relatively soft springs and a torsionally rigid frame to contribute to the vehicle controllability and comfort, and the wheels closely follow the ground contour. The rigid frame, also maintains the pitch axis at its design location, whereby the contributory effect of optimum, fixed pitch axis location, soft springs and rigid frame cooperate synergistically to minimize pitching, provide accurate steering control, and increase riding comfort in a high speed, all-terrain vehicle.

DESCRIPTION OF THE PREFERRED EMBODIMENT

Figure 1:
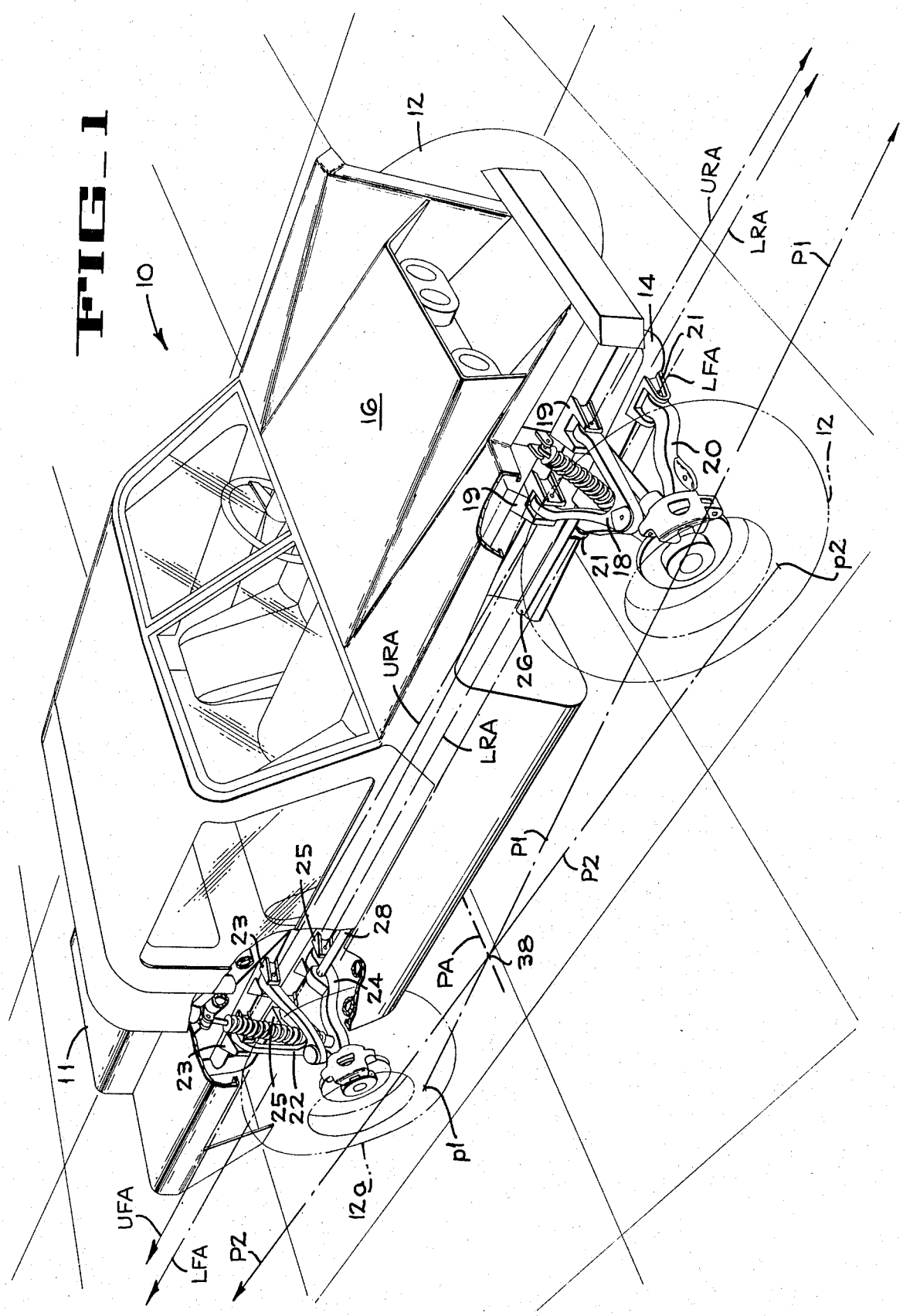
FIG. 1 is a perspective, partly broken away, of a four wheel drive vehicle incorporating a four wheel independent A-arm suspension in accordance with the present disclosure.

FIG. 1 illustrates the suspension of the present invention applied to a four wheel drive military vehicle 10, intended for reconnaissance over all types of terrain. The vehicle features a low silhouette, high mobility and speed, and includes a rear mounted engine (not shown) under a rear deck 11, which engine powers each of the front wheels 12 and the rear wheels 12a. The aforesaid Hickey application discloses a preferred drive train. At the front of the vehicle frame 14, a fuel storage cell (not shown) is mounted under the hood 16. The design center of gravity CG (FIG. 2) is based on the load of a half filled fuel storage cell and the driver, and additional fuel and occupants will shift the center of gravity CG forward, closer to or coincident with, a median plane which is equidistant between the axes of the front and rear wheels.

FRONT SUSPENSION GEOMETRY

As shown for the right or near side of the vehicle 10 in FIG. 1, the front wheels 12 are suspended from the frame 14 by a control arm assembly including an upper A-arm 18 and a lower A-arm 20. These control arms mount the wheel spindles with the usual steerable ball joints. The upper control arm 18 is pivoted to the frame by two brackets 19 and the lower control arm 20 is pivoted to the frame by two brackets 21. This structure is generally conventional, the present invention being directed to the geometrical disposition of the control arm to frame pivot axes.

REAR SUSPENSION

At the rear, the spindles for the wheels 12a are also suspended on ball joints by a control arm assembly having upper and lower A-arms 22 and 24, respectively. The arms 22, 24 are pivoted to the frame at paired brackets 23 and 25, respectively. As shown in the aforesaid Hickey application, the rear wheels 12a are prevented from steering on their ball joints by linkages (not shown).

TORSION BARS

Front and rear torsion bar springs 26 and 28 are connected at one end to the front and rear lower A-arms 20 and 24 and to the frame (connections not shown) at the other end. This construction, and the frame 14 is not herein shown in detail, but a suitable frame and chassis design is shown in detail in the aforesaid pending Hickey application. The frame 14 is preferably a "space frame" of welded tubular construction including overhead members enclosing the passenger compartment so that the frame is torsionally rigid to prevent any relative movement among the swing axes of the four sets of A-arms. An alternative construction is to eliminate a separate frame and make the vehicle of a rigid, unit frame body construction.

The torsion bar springs 26 and 28 are relatively soft (low stiffness coefficient) as compared to the springs of similar four wheel drive military vehicles. In combination with the rigid frame and the improved suspension geometry to be described in detail, the soft springs enable the wheels to closely follow ground contours while the vehicle has minimal fore and aft pitching.

SUSPENSION GEOMETRY

Figure 2:
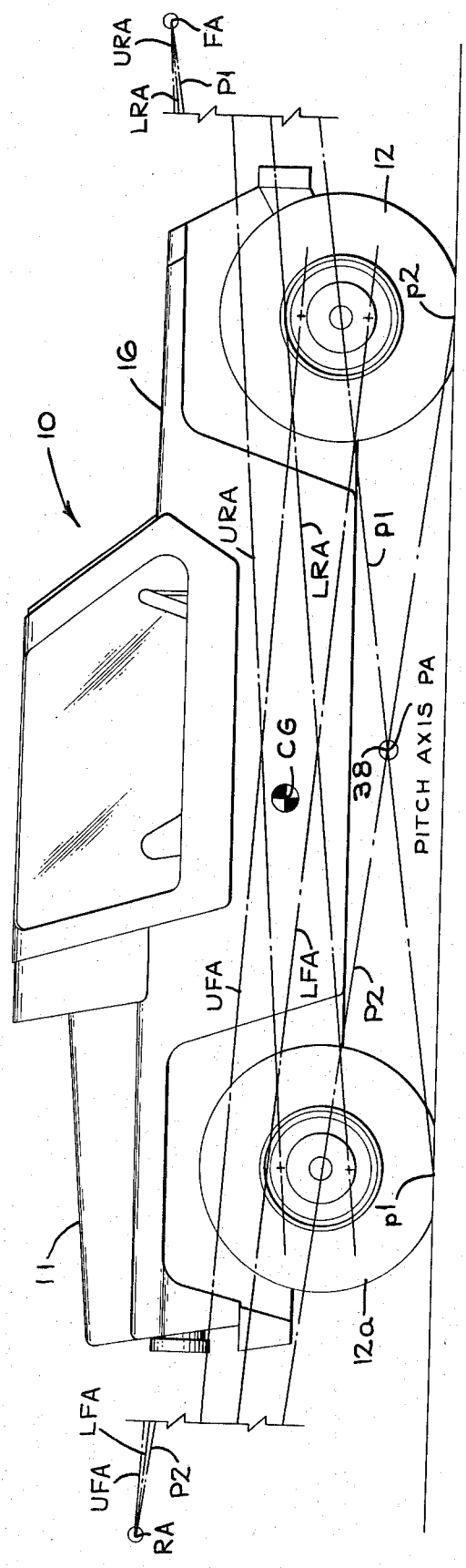
FIG. 2 is a side elevation of the vehicle shown in FIG. 1, with reference lines indicating the location of certain axes critical to ride, stability and control.
Figure 3:
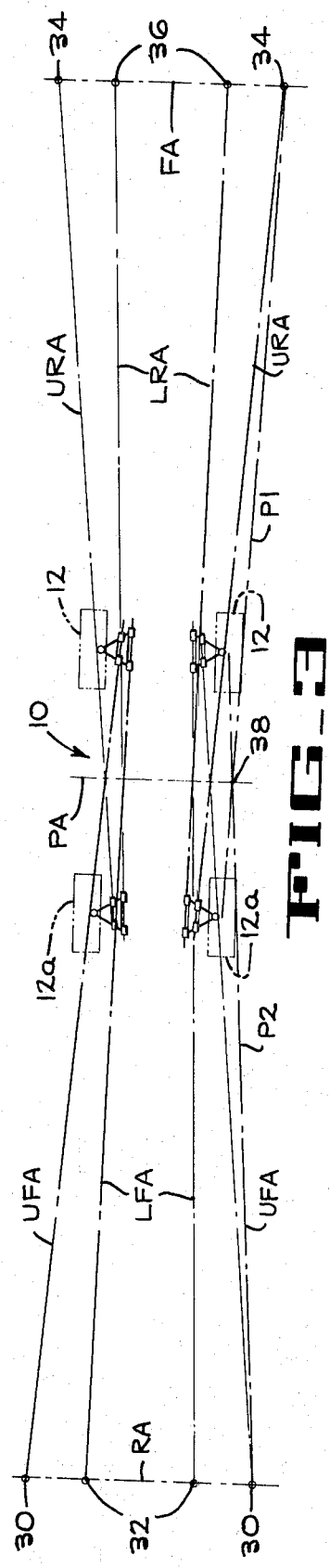
FIG. 3 is a diagrammatic plan, at reduced scale, illustrating the wheels, suspension axes and some of the reference lines of FIG. 2.

Each upper front A-arm 18 is pivoted on its paired brackets 19 to swing, relative to the frame 14, about an upper, front control arm axis UFA, and as seen in FIG. 2, the axis UFA inclines upwardly toward the rear. The lower front A-arm 20 is pivoted on its paired brackets 21 to swing about a lower front control arm axis LFA, which also inclines upwardly toward the rear. A critical feature of the suspension is that these control arm pivot axes UFA and LFA are also upwardly converging, so that although the axes in question may diverge in the horizontal plane (FIG. 3), the axes actually intersect at a common, horizontal rear reference line RA that is well behind the vehicle (FIG. 2). FIG. 3 shows how the axes UFA and LFA meet the rear reference line RA at separate points 30 and 32, respectively. The reference line RA can be considered to represent an instantaneous center of the front wheel control arms 18, 20.

The separation of the intersection points 30, 32 of the control arm axes UFA, LFA with the instantaneous center RA (FIG. 3) provide anti-dive and anti-lift features that change the wheel caster to minimize fore and aft tilt when braking or accelerating. It is conventional to provide control arm axes that diverge horizontally in the manner indicated in FIG. 3 in order to control dive and lift, and such divergence is incidental to the present pitch control system.

The rear wheel suspension is the same as the front wheel suspension, except that the rear wheels 12a do not steer and then control arm axes are oppositely disposed. Each upper rear A-arm 22 is pivoted in paired frame brackets 23 to swing about an upper rear control arm axis URA, which axis inclines upwardly in the forward direction. Each lower rear A-arm 24 is pivoted in paired frame brackets 25 (front bracket visible in FIG. 1) to swing about a lower rear control arm axis LRA which also inclines upwardly. As in the case with the front suspension axes UFA and LFA, the rear suspension axes URA and LRA intersect at a common horizontal instantaneous center or reference line FA (FIG. 2) at horizontally spaced points 34 and 36 (FIG. 3) and the center FA is at the same distance ahead of the rear wheels as the instantaneous center RA is behind the front wheels.

VEHICLE PITCH AXIS

With the above described geometry of the front and rear wheel suspensions, the location of the effective pitch axis PA (FIG. 2) for the vehicle is determined as follows. A pitch axis reference line P1 is drawn in side elevation from the central contact point p1 of the rear tire to the front instantaneous center FA, and a line P2 is drawn from the contact point p2 of the front tire to the rear instantaneous center RA. The reference lines P1 and P2 intersect at 38, which determines the position of a horizontal axis PA which I have called the pitch axis. Any vertical force, or any horizontal longitudinal force, applied to the sprung portion of the vehicle through the axis PA will not result in any pitching motion.

In the present case, the pitch axis PA is equidistant from the front and rear wheels, but it is evident that by a slight relocation of the wheel suspension pivot axes UFA, LFA and/or URA and LFA, the pitch axis PA can be located at another point intermediate the front and rear wheels. The preferred longitudinal location of the pitch axis PA is as close as possible to the center of gravity CG. This provides the most ideal condition, because vertical accelerations of the sprung components of the vehicle will then have minimal effect on pitching. It is also desirable that the pitch axis be as close as possible to the passengers so that the motion caused by the ground contours is least apparent. A vehicle designed under the present invention, and having an independent A-arm wheel suspension, does not require special re-location of its center of gravity to achieve the disclosed anti-pitch characteristics. Given a center of gravity location, the vehicle suspension can be designed, under the present invention, to locate the pitch axis PA near the given center of gravity CG.

By way of example, the vehicle 10 under description has a wheelbase of 120 inches and its wheel axes are about 16½ inches above ground level. The instantaneous centers RA and FA are 50.85 inches above the ground, and about 393 inches from the associated wheel spindles. The center of gravity CG of the vehicle is about 22 inches above the ground, and the effective pitch axis PA (FIG. 2) is about 7.83 inches above the ground.

It should be noted that although the instantaneous centers (axes FA and RA) are positioned a considerable distance beyond the wheelbase of the vehicle, in some instances it may be desirable to position the control arm axes UFA, LFA and URA, LRA so that the instantaneous centers RA and FA lie within the wheelbase. For example, this feature may be useful in special cases to modify the anti-dive or anti-lift characteristics such as for a two wheel drive vehicle. The angles of the control arm axes may also be adjusted to hinge the pitch axis PA close to a center of gravity CG which is horizontally or vertically offset from the generally centrally located center of gravity illustrated in FIG. 2.

The suspension for the left side of the vehicle 10 is a mirror image of (FIG. 3) and is complementary to the suspension for the right side just described, and hence will not be described in detail.

Since the pitch control function of the present invention is obtained simply by a small angular tilting of the swing axes for the A-arms, and since the aforesaid tilting of these axes does not upset the usual and conventional suspension geometry as to steering axis inclination, caster, and so forth, all other suspension geometries can be arranged to provide optimum steering characteristics.

By way of emphasizing the advantages of the present pitch control system over the results obtained by conventional design procedures, it has heretofore been the practice to control fore and aft pitch by experimentally or empirically combining springs and shock absorbers of various design properties to tune a given suspension system to some theoretical or compromise condition. Thus the resultant design is most effective only over a limited range of actual operating conditions. Furthermore, the compromise selection of springs and shock absorbers usually affects the other suspension characteristics, thus making the suspension system design as a whole a difficult task. The effectiveness of shock absorbers changes over a period of operation, whereas the geometrical features of the present system are relatively invariant and hence the design characteristics of the vehicle are maintained for long periods of time, excluding the case of excess wear in the suspension joints caused by long use and lack of lubrication. Furthermore, providing the geometrical location of the pitch axis PA under the present invention provides a simpler solution than the conventional approach, and can be employed for any vehicle with independent A-arm suspension, because under all pitch attitudes the system of the present invention provides optimum pitch control and yet it does not upset steering and other suspension design considerations.

It will be apparent that when the pitch axis PA is always close to the center of gravity CG, the moment arm between these points is short. This reduces the effect of longitudinal forces acting through the center of gravity about the pitch axis. This condition, in turn, reduces the pitching that must be resisted by the springs or the conventional anti-dive, anti-lift factors of the suspension system. The present system, in cooperation with torsionally rigid frame to maintain the pivot axes of the A-arms in the same spatial and angular interrelation, permits using relatively soft springs, and the shock absorbers need only damp the wheel oscillations and need not be relied upon to control pitching of the entire vehicle.

In summary, my method of providing a single effective transverse pitch axis PA, about which the sprung mass of the vehicle will rotate if a pure couple or moment is generated in a longitudinal plane of the vehicle, is simple and requires no additional mechanism. It is only necessary to converge the upper and lower pivot axes of the front and rear control arms so that the pitch center reference lines P1 and P2 (FIG. 2) from each instantaneous center FA and RA to the tire contact points p1, p2, intersect at a pitch axis PA, which is disposed at a selected position relative to the center of gravity CG and/or the passenger location. Thus located, the pitch axis PA assures minimal fore and aft pitching of the vehicle, separate, distinct and superposed upon the ordinary pitch control afforded by the empirical selection of springs and shock absorbers. Thus the pitch control system of the present invention, coupled with conventional pitch control, features provided by the springs and shock absorbers, provides a vehicle having improved suspension characteristics, and in an off-road military vehicle the present invention increases the safety of high speed operation and improves vehicle mobility.

Although the best mode contemplated for carrying out the present invention has been herein shown and described, it will be apparent that modification and variation may be made without departing from what is regarded to be the subject matter of the invention.

What is claimed is:

1. A four wheeled road vehicle of the type having a frame and an independent suspension comprising upper and lower control arms pivoted to the frame and mounting each wheel; the improvement whereby the frame pivot axes of the control arms for all wheels are vertically convergent, the control arm axes for the rear wheels intersecting one transverse instantaneous center line and the control arm axes for the front wheels intersecting another transverse instantaneous center line, the instantaneous center line of the rear wheel control arm axes lying a substantial distance forward of the front wheels and the instantaneous center line of the front wheel control arm axes lying at substantially the same distance rearward of the rear wheels, reference lines drawn between the instantaneous center lines and the contact points of their associated wheels with the ground intersecting at a transverse vehicle pitch axis that is closely between the front and rear wheels and is adjacent to the center of gravity of the vehicle.

2. A four wheeled road vehicle of the type having a frame and an independent suspension having upper and lower control arms pivoted to the frame and mounting each wheel; the improvement whereby the frame pivot axes of the control arms for all wheels are vertically convergent, the control arm axes for the rear wheels intersecting one transverse instantaneous center line and the control arm axes for the front wheels intersecting another transverse instantaneous center line, the instantaneous center line of the rear wheel control arm axes lying a substantial distance forward of the rear wheels and the instantaneous center line of the front wheel control arm axes lying at substantially the same distance rearward of the front wheels, reference lines drawn between the instantaneous center lines and the contact points of their associated wheels with the ground intersecting at a transverse vehicle pitch axis that is between the front and rear wheels and is adjacent to the center of gravity of the vehicle, said instantaneous center lines being sufficiently above the center of gravity of the vehicle to bring the intersection of said reference lines adjacent to but slightly below said center of gravity.

* * * * *

UNITED STATES PATENT OFFICE
CERTIFICATE OF CORRECTION

PATENT NO. : 3,858,901
DATED : January 7, 1975
INVENTOR(S) : NORMAN B. JOHNSON

It is certified that error appears in the above-identified patent and that said Letters Patent are hereby corrected as shown below:

Column 2, line 54: change "spring" to --sprung--.

Column 7, line 14: delete "closely" and insert after "is" (second occurrence) --closely--.

Signed and Sealed this sixteenth Day of December 1975

[SEAL]

Attest:

RUTH C. MASON
Attesting Officer

C. MARSHALL DANN
Commissioner of Patents and Trademarks